United States Patent [19]
Benoit et al.

[11] Patent Number: 5,706,873
[45] Date of Patent: Jan. 13, 1998

[54] AUTOMOTIVE FLUID RECOVERY APPARATUS

[76] Inventors: Côme Benoit, R. R. #2, Boîte 4, Site 8, Sheila, New Brunswick, Canada, E0C 1Z0; Benoît Rioux, C. P. 87, St-Isidore, New Brunswick, Canada, E0B 2L0

[21] Appl. No.: 611,216

[22] Filed: Mar. 5, 1996

[51] Int. Cl.⁶ .................................................. B65B 3/00
[52] U.S. Cl. .................. 141/98; 141/67; 141/104; 141/106; 141/331; 141/338; 184/1.5; 184/106; 220/573; 137/513.7
[58] Field of Search .................... 141/67, 86, 87, 141/92, 98, 104, 106, 331, 333, 337, 338; 184/1.5, 106; 220/571–573; 137/513.7

[56] References Cited

U.S. PATENT DOCUMENTS

| | | | |
|---|---|---|---|
| 1,305,735 | 6/1919 | Morris | 184/1.5 |
| 1,606,342 | 11/1926 | Bruce | 184/1.5 |
| 1,651,616 | 12/1927 | Morrison | 184/1.5 |
| 1,871,522 | 8/1932 | Holmes et al. | 184/1.5 |
| 1,949,394 | 2/1934 | Martin . | |
| 1,949,777 | 3/1934 | Bristol . | |
| 2,035,093 | 3/1936 | Nielsen | 184/1.5 |
| 2,102,795 | 2/1937 | Gray | 184/1.5 |
| 2,531,288 | 11/1950 | Moore . | |
| 2,645,243 | 7/1953 | Turner | 137/513.7 |
| 2,810,776 | 10/1957 | Brill et al. | 141/331 X |
| 2,929,399 | 3/1960 | Magowan, Jr. | 137/513.7 |
| 3,944,199 | 3/1976 | Johnson . | |
| 4,030,520 | 6/1977 | Sands | 137/513.7 |
| 4,638,841 | 1/1987 | Heath . | |
| 5,101,869 | 4/1992 | Myers | 141/331 X |
| 5,301,724 | 4/1994 | Maxwell | 141/98 |
| 5,316,059 | 5/1994 | Lahnan et al. | 141/98 X |
| 5,349,995 | 9/1994 | Perez | 141/98 |
| 5,389,253 | 2/1995 | Cicconi | 141/331 X |
| 5,477,897 | 12/1995 | Scofield | 141/106 X |

FOREIGN PATENT DOCUMENTS 2077024 of 1992 Canada .

*Primary Examiner*—J. Casimer Jacyna
*Attorney, Agent, or Firm*—Mario D. Thériault

[57] ABSTRACT

An apparatus for use in a service station to recover automotive fluids. The apparatus comprises a reservoir attachable to a floor surface and a catch pan for receiving automotive fluids flowing from under a vehicle being serviced. The apparatus also comprises a hollow extensible arm means between the catch pan and the reservoir forming a conduit therebetween, and an articulated joint between the extensible arm means and the reservoir. This articulated joint is flexible in a vertical plane as well as in a horizontal plane. Thus the catch pan and the extensible arm means are movable between a first horizontal fluid recovery position and a second vertical compactly stowed position above the reservoir. The reservoir of the apparatus also has a first drain valve and a second drain valve located above the first drain valve. When the apparatus is used to recover several types of automotive fluids, those aqueous fluids such as radiator coolant may be firstly emptied from the reservoir through the first drain valve. Then the petroleum based fluids can be emptied through the second drain valve even if a nominal volume of aqueous fluid remains in a lower portion of the reservoir below the second drain valve.

20 Claims, 3 Drawing Sheets

AUTOMOTIVE FLUID RECOVERY APPARATUS

FIELD OF THE INVENTION

The present invention relates to an apparatus to recover motor oil, brake and transmission fluids, or radiator coolant from a vehicle being serviced. More particularly, the present invention relates to an articulated arm supporting a catch pan in a first fluid recovery position or in a second compactly stowed position.

BACKGROUND OF THE INVENTION

It is a generally known fact that automotive fluids, lubricants and engine coolants contain elements that may be harmful to the environment. Therefore, it has been a common practice, and more so in the present days, to promote the safe handling of such fluids in order to prevent any spills thereof on the ground, or in sewer systems through floor drains.

Used automotive fluids and lubricants in bulk are usually collected at service stations by a tanker truck having an intake metering pump. Hence it may be possible to compare the volume of recovered fluids and lubricants with the purchase of new oil and coolants by clients at that garage, to closely monitor any spills of such fluids at that location. This proposed auditing practice would enhance good habits in the handling of used automotive fluids in service stations.

Before promoting such an accounting procedure, however, auto-mechanics must be provided with adequate fluid recovery apparatus that are sturdy, reliable and compatible with the usually encumbered floor area near a vehicle hoist.

In this respect, various efforts have been made in the past to develop lubricant recovery systems for garages. As a first example, U.S. Pat. No. 1,949,777, issued on Mar. 6, 1934 to C. J. Bristol, discloses a horizontally pivoted hollow arm carrying an oil receptacle. The arm is attached to a vehicle lift and is connected to an underground piping and reservoir. A similar apparatus is also illustrated in U.S. Pat. No. 2,035,093, issued on Mar. 24, 1936 to L B. Nielsen.

In another example, U.S. Pat. No. 2,531,288 issued on Nov. 21, 1950 to W. C. Moore, discloses an extension drain which is also horizontally foldable to extend under a vehicle supported on a hoist. The extension drain is connected to a reservoir alongside the vehicle hoist.

In the first exemplified installations, the piping to the used fluid reservoir must be routed under the garage floor. Therefore, such installations may not be practical for those existing garages where the cement floor is sound and smooth. Moreover, the extension arms of these devices of the prior art do not retract entirely, and may be found obstructing especially in those garages where the floor space is fully utilized.

In a third example of the prior art there is illustrated in U.S. Pat. No. 4,638,841, issued on Jan. 27, 1987 to Thomas E. Heath a device for handling fluids drained from a vehicle. This device comprises a catch pan mounted on a portable drum. The drum is equipped with casters which are generally small and which do not roll freely on uneven floors. Therefore, these drums are generally easily tipped over, spilling their content on the floor and polluting sewage systems.

Moreover the content of those drum type receptacles is usually transferred into larger open-topped containers outside the service station, by handling the drum and tipping it over. It is a common occurrence at those facilities that a relatively large ground area around these outside containers is soaked with waste oil from spills occurring during the pouring of the fluids thereinto.

Hence, despite all the efforts of others to develop the prior art automotive fluid recovery equipment, there still are numerous service stations operating in the aforesaid contaminated and hazardous conditions. The reasons for this being that the equipment of the prior art is either not agreeably used by auto-mechanics or simply not reliable for handling the fluids safely.

SUMMARY OF THE PRESENT INVENTION

In the present invention, however, there is provided an apparatus for use in a service station to recover automotive fluids. The automotive fluid recovery apparatus comprises a reservoir having an apertured flange attachable to a floor surface, and a catch pan for receiving automotive fluids flowing from a vehicle being serviced. The apparatus also comprises a hollow extensible arm means between the catch pan and the reservoir, forming a conduit therebetween.

In accordance to one aspect of the present invention, the fluid recovery apparatus further comprises an articulated joint between the extensible arm means and the reservoir. This articulated joint is flexible in a vertical plane as well as in a horizontal plane. The catch pan and the extensible arm means are thereby movable between a first horizontal fluid recovery position and a second vertical compactly stowed position above the reservoir.

A first advantage of this aspect of the present invention is that the automotive fluid recovery apparatus may be readily installed in existing service stations along a vehicle hoist for example, without conceding much invaluable floor space near those vehicle hoists.

In accordance to another aspect of the present invention, the reservoir of the apparatus has a sight glass to monitor the level of fluid therein. The reservoir also has a first drain valve and a second drain valve located above the first drain valve. Therefore, when the apparatus is used to recover several types of automotive fluids, those aqueous fluids such as radiator coolant may be firstly emptied from the reservoir through the first drain valve. Then the petroleum based fluids can be emptied through the second drain valve even if a nominal volume of aqueous fluid remains in a lower portion of the reservoir below the second drain valve.

When the two types of automotive fluids are allowed to settle in the reservoir, it possible to recover both types of fluids with minimum contamination between the two.

In accordance to yet another aspect of the present invention, the catch pan of the apparatus for recovering automotive fluids, comprises an opened upper side and an opening in a bottom portion thereof through which automotive fluids can flow towards the reservoir.

The catch pan of this further aspect of the present invention also has a perforated basket being positioned between the opened side and the bottom opening. This basket has a central flat and horizontal section and slightly inclined peripheral sections. The size of the apertures of this basket is smaller than commonly replaceable parts of a drive train and wheels of a motor vehicle. Thus, this catch pan with the basket therein is a useful tool tray for auto-mechanics performing repair jobs underneath a vehicle.

For these reasons, the automotive fluid recovery apparatus of the present invention is easily installed, convenient to use and compact in size when folded upwardly. The apparatus of the present invention provides a safe method for handling several types of hazardous automotive fluids, while respecting the space limitation requirements of modern service station equipment.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
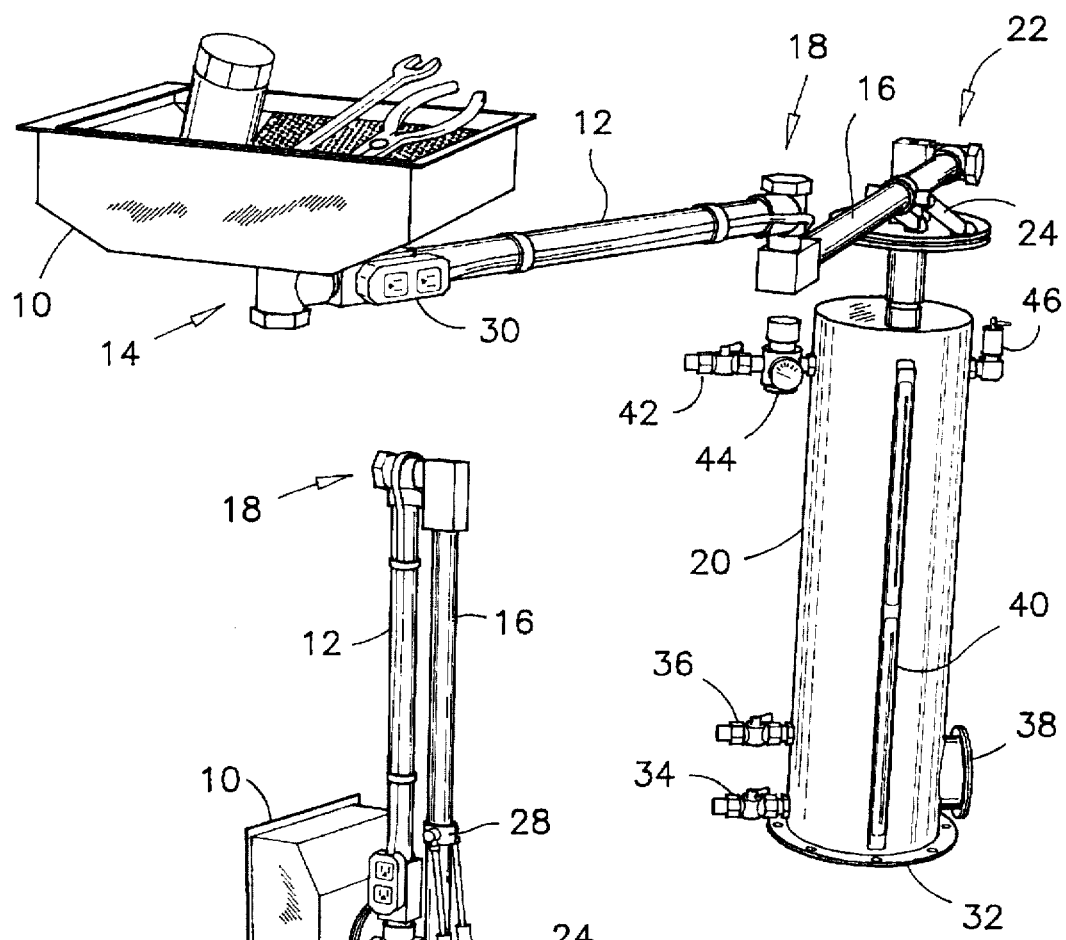
FIG. 1 is a perspective front and top view of the automotive fluid recovery apparatus of the preferred embodiment, in the extended fluid recovery position.
Figure 2:
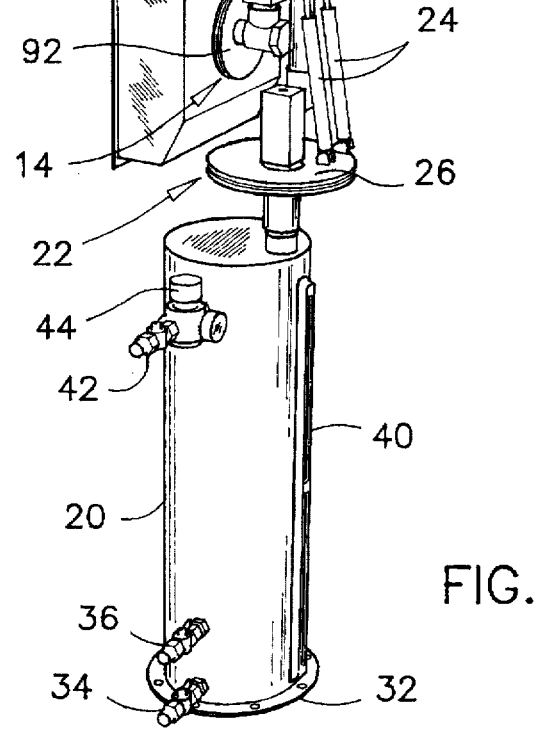
FIG. 2 is a perspective front, left side and top view of the preferred embodiment, in the stowed position.

Referring to FIGS. 1 and 2, there is illustrate an automotive fluid recovery apparatus of the preferred embodiment. The fluid recovery apparatus comprises a catch pan 10 pivotally mounted at the end of a first hollow arm member 12 by means of a first articulated joint 14. The first hollow arm member 12 is connected to a second hollow arm member 16 by means of a second articulated joint 18. The second hollow arm member 16 is connected to a reservoir 20 by means of a third articulated joint 22.

The planes of articulation of the catch pan 10 and of the first hollow arm member 12 about the first and second articulated joints 14,18 respectively, are principally horizontal and parallel to one-another, while the second hollow arm member 16 is movable about the third articulated joint 22 in a vertical plane as well as in a horizontal plane.

In use, the automotive fluid recovery apparatus of the preferred embodiment can thereby be extended under an automobile to be serviced, typically in the position as illustrated in FIG. 1, or it can be stowed away during non-use periods in a compact vertical position as illustrated in FIG. 2. Hence, when the apparatus of the present invention is stowed away in a vertical position, the floor encumbrance therefrom is minimum.

The raising and lowering of the second hollow arm member 16 may be assisted by two gas springs 24 mounted between a circular flange 26 on the third articulated joint 22 and a collar 28 on the second hollow arm member 16. The collar 28 may be adjustable along the hollow arm member 16, and both gas springs 24 may have gland collars on their rods to adjust a horizontal and a vertical positions of the second hollow arm 16. The gland collars on the gas springs 24 and the adjusting feature of the collar 28 are not illustrated here for being well known in the art of gas springs and pneumatic cylinders.

All three articulated joints 14, 18, 22 are hollow, forming with both hollow arm members 12, 16 a conduit between the catch pan 10 and the reservoir 20. The hollow formation within the three articulated joints 14, 18, 22, are oriented to cooperatively form a downwardly sloped conduit, through which a fluid recovered into the catch pan flows by gravity into the reservoir 20.

The reservoir 20 of the automotive fluid recovery apparatus of the preferred embodiment preferably has a cylindrical shape, and a preferred volume of over 60 liters, and ideally of about 75 liters. This volume is required to contain the used oil recovered in a typical work day, that is of fifteen to eighteen modern cars averaging a crankcase volume of about 4 liters each. In this regard, a 30 cm diameter cylinder having a height of 107 cm provides a volume of 75 liters for receiving freely the maximum preferred volume of used oil.

A preferred combined vertical projection of the articulated joints 14, 18, 22 and of the catch pan 10 should be such that the height of an upper edge of the catch pan 10 from the floor during use in the fluid recovery position, is approximately 152 cm. This dimension has been found to provide a comfortable height for working under a typical car hoist having a maximum raising height of about 180 cm.

The first hollow arm member 12 of the preferred embodiment may also optionally carry an electrical receptacle 30, or an air pressure intake coupling (not shown) to supply power to work lights and power tools which are usually required when the apparatus of the present invention is used.

The reservoir 20 of the automotive fluid recovery apparatus of the preferred embodiment has a flange 32 in a lowermost portion thereof, and holes in that flange 32 to rigidly affix the reservoir 20 to the floor by means of anchor bolts for example. Thus, the automotive fluid recovery apparatus may be readily installed in existing garages, in a position which is mostly appropriate to the layout of existing equipment.

The reservoir 20 of the automotive fluid recovery apparatus of the preferred embodiment also has a first drain valve 34, and a second drain valve 36 vertically spaced apart from the first drain valve 34. A hand hole and cover 38 may also be provided to periodically clean any residues accumulating in the reservoir 20.

The reservoir 20 of the automotive fluid recovery apparatus of the preferred embodiment further has a sight glass 40 for verifying the level of fluid therein, an air pressure inlet valve 42, an air pressure regulator 44, and a pressure relief valve 46.

In order to empty the reservoir 20 of the preferred embodiment, an air supply hose may be connected to the air inlet valve 42, to increase a pressure inside the reservoir 20; to force the fluid out of the reservoir 20 through either drain valve 34 or 36; through a drain hose (not shown), and into a waste fluid storage container. This storage container (not shown) is preferably located outside the service station where a recovery tanker truck has access to it at all times.

When emptying the reservoir 20, a recommended air inlet pressure into the inlet valve 42 is about 275 kPa. Accordingly, an air pressure regulator 44 is installed in-line with the inlet valve 42, and is set at the recommended pressure. The recommended setting for the relief valve 46 is about 345 kPa, to prevent unnecessary stresses on the reservoir 20.

The purpose of a first drain valve 34 and of a second drain valve 36 is to allow the recovery of both aqueous and petroleum types of automotive fluids with a same apparatus. Petroleum based products naturally float over aqueous products such as radiator coolant. Therefore a recommended procedure to empty the reservoir 20 in which both types of fluids have been collected, is to firstly force the aqueous coolant out of the reservoir 20 through drain valve 34, until the level of coolant, as seen on the sight glass 40, is below the second drain valve 36, and preferably at a mid-point between the first drain valve 34 and the second drain valve 36. This aqueous product should be piped into a first waste storage tank. Then, the petroleum based products such as engine oil, transmission fluid and brake fluid may be recovered through the second drain valve 36, and into a second waste storage tank.

Figure 3:
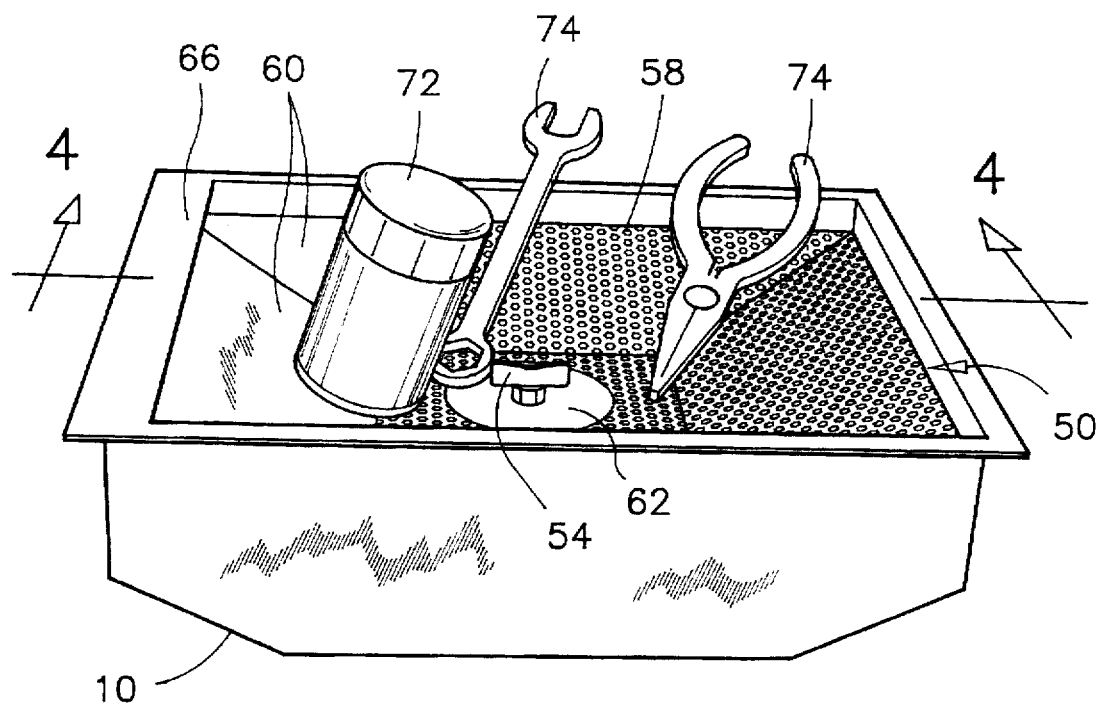
FIG. 3 is a perspective front and top view of the catch pan of the preferred embodiment.
Figure 4:
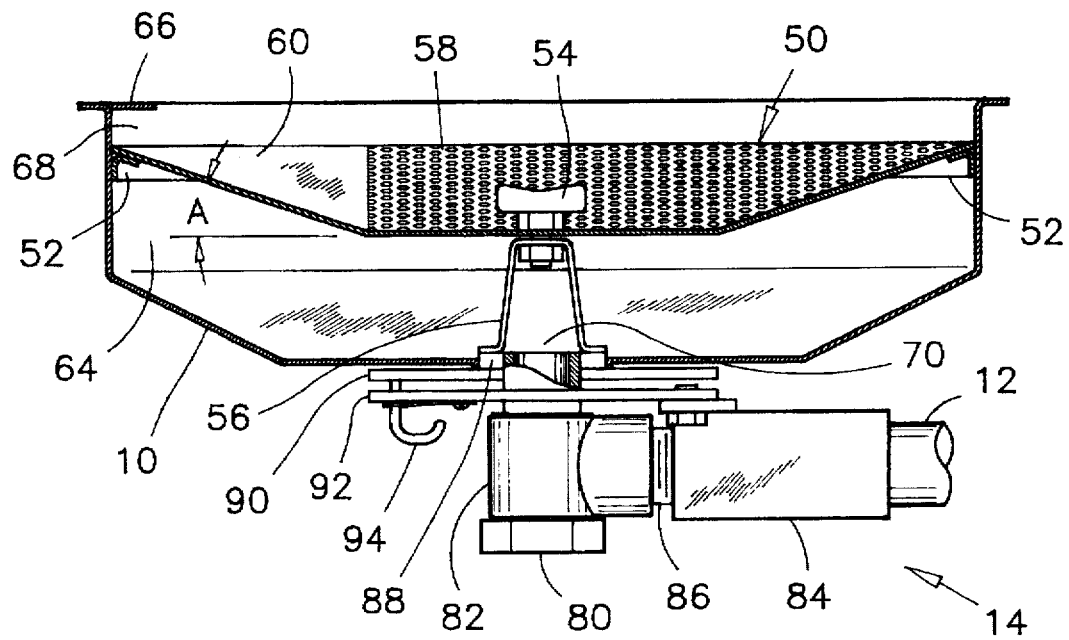
FIG. 4 is a cross-section view of the catch pan, along line 4—4 of FIG. 3.

Referring now to FIGS. 3 and 4, the catch pan 10 of the preferred embodiment has a rectangular shape with preferred dimensions of 40 cm by 50 cm. These dimensions are advantageous to recover engine oil and transmission fluid at the same time when servicing most modern vehicles. The catch pan 10 of the preferred embodiment has a perforated basket 50 supported on a peripheral lip 52. The basket 50 is retained inside the catch pan 10 by means of a wing-type bolt 54 threadably engaged into a support bracket 56 on the bottom surface of the catch pan 10. The perforated basket 50 is thereby removable to clean any residues accumulating inside the catch pan 10.

The basket 50 has a perforated portion 58, a first closed portion 60, and a second closed portion 62. The first closed portion 60 is preferably placed at a normally farthermost position from the reservoir 20. The closed portion 60 is preferably held in a sealed manner against the peripheral lip 52. A receptacle 64 thus formed when both arm members 12, 16 are raised in a stowed position as illustrated on FIG. 2, retains any fluids which may have accumulated in the first hollow arm member 12, and dripped back into the catch pan 10.

Similarly, the upper edge of the catch pan 10 has on a same side as the first closed portion 60, a flanged border 66 protruding inside the opening of the catch pan 10 to form a cavity 68. This cavity 68 collects any fluids which may have adhered to the surface of the basket 50, to prevent a dripping of those fluids on the floor when the automotive fluid recovery apparatus is stowed in a vertical position.

The second closed portion 62 covers a central area of the basket 50 immediately in line with the opening 70 through the bottom surface of the catch pan 10. This second closed portion 62 deflects any backward flow of fluid towards the receptacle 64 when both hollow arm members 12, 16 are hastily raised in a vertical position while some fluid remains in hollow arm member 12.

The basket 50 of the catch pan 10 preferably has a flat central section and four side sections sloping at about 20° or less as shown by label "A" on FIG. 4. A first advantage of this arrangement is that an oil filter 72 may be set in the basket 50 with a slight incline as shown on FIG. 3, to prevent the formation of air locks therein, and to facilitate its complete drainage of oil.

The perforated portion 58 of the basket 50 has a plurality of closely spaced apart holes, each having a diameter of between about 3 mm to about 5 mm. The catch pan 10 having such basket 10 with relatively small holes and inclined sections as previously mentioned is advantageously used by auto-mechanics to support tools 74 at a convenient angle, and to perform many repair jobs other than replacing lubricant and radiator coolant.

For example, the catch pan 10 of the preferred embodiment may be positioned under a brake disk or drum during the bleeding of a brake piping system, or to catch small parts which may fall out during the replacement of a calliper or a brake shoe. The catch pan 10 may also be used to degrease mechanical parts while the parts are held in the basket 50, away from the dirt and grease accumulating at the bottom of the pan 10.

The first articulated joint 14 comprises a tubular stem 80 rotatively held in a T-fitting 82. The T-fitting 82 is connected to a rectangular hollow block 84 forming an end of the first hollow arm member 12, by means of a pipe nipple 86.

The tubular stem 80 is engaged into a boss 88 on a bottom portion of the catch pan 10. The lower portion of the catch pan 10 also has a first circular member 90 affixed thereto, and in a co-axial relationship with the stem 80. A second circular member 92 is also mounted in a co-axial relationship with the stem 80, but is affixed to the rectangular block 84. A latch member 94 through the second circular member 92, in cooperation with a series of holes in the first circular member 90 may optionally be used to lock an angular position of the catch pan 10 relative to the first hollow arm member 12 when required.

Figure 5:
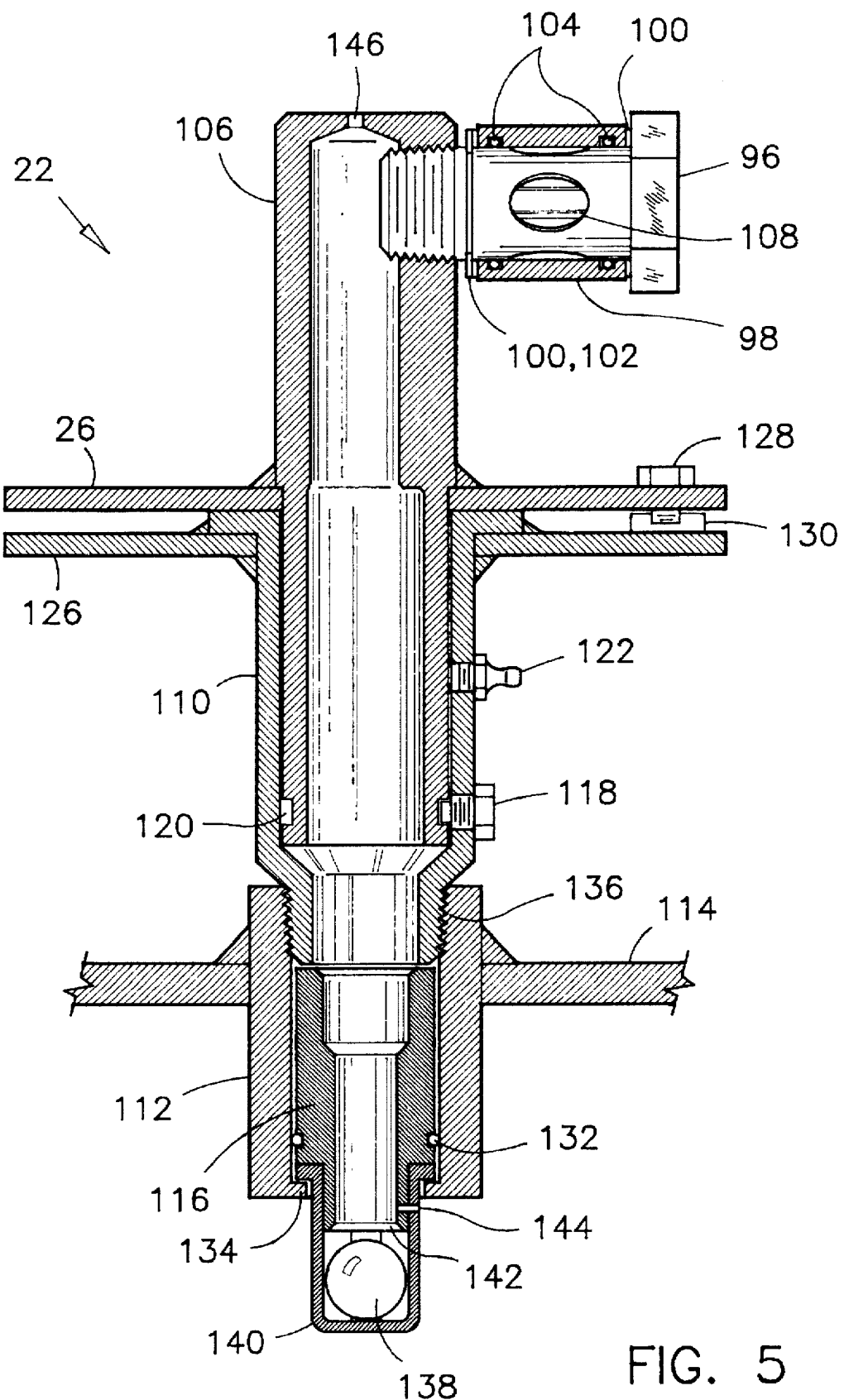
FIG. 5 is a cross-section view of the third articulated joint assembly.

Referring now to FIG. 5, there is illustrated a cross-section view of the third articulated joint 22 and a partial cross-section view of an uppermost portion the reservoir 20. An end of the second hollow arm member is connected to a T-fitting 98 similar in shape and size than the T-fitting 82 on the first articulated joint and on the second articulated joint 18. The T-fitting 98 is pivotally supported on a tubular stem 96 which is also similar to the tubular stems of articulated joints 14 and 18.

The T-fitting 98 is preferably guided on stem 96 by means of a washer 100 on a first side thereof and a washer 100 and a locking ring 102 on the other side thereof. A pair of 0-rings 104 inside grooves in the T-fitting 98 are preferably used to prevent any leak of waste automotive fluids from the joint.

A threaded portion of the stem 96 is engaged in a hollow swivel block 106. The waste automotive fluids flowing through both hollow arm members 12,16 is lead into several apertures 108 in the tubular stem member 96, and into the hollow swivel block 106. The hollow space inside the swivel block 106 communicated inside the reservoir 20 through a sleeve member 110, a mounting coupling 112 on a cap plate 114 of the reservoir 20, and through a check valve body 116.

The swivel block 106 is pivotally mounted into the sleeve member 110, and is retained thereinto by means of a bolt 118 cooperating with a circular groove 120 in the swivel member 106. A grease fitting 122 may also be provided on the sleeve member 110 to lubricate a movement of the swivel block 106 thereinto.

The upper circular flange 26 is affixed to the swivel block 106, and a lower circular flange 126 is affixed to the sleeve member 110. In this preferred embodiment of the present invention, one or more screw 128 through the upper circular flange 26 cooperating with one or more stopper block 130 on the lower circular flange 126 control the angular movement of the second arm member 16 about an axis of rotation of the swivel block 106.

In this preferred embodiment, a check valve is required to prevent any backward flow of used automotive fluids through the third articulated joint 22 when the reservoir 20 is being emptied. This check valve comprises a valve body 116 having an 0-ring 132 on its outside surface. The valve body 116 is held inside the mounting coupling 112, between a shoulder 134 on a lower end of the coupling 112, and a threaded engagement 136 of the sleeve member 110 into the mounting coupling 112.

The check valve also comprises a floatable ball 138 loosely held inside a cage member 140. A circular seat 142 is also provided on a lower end of an opening through the valve body 116. When an air pressure in applied inside the reservoir 20 to empty its content for example, an initial air flow through the valve body 116 forces the ball against the circular seat 142, and closes the check valve.

A seep aperture 144 is provided in the valve body 116 to eliminate any residual pressure remaining inside the reservoir following a purging operation, and to allow the check valve to open in order to resume recovery of automotive fluids.

Another vent hole 146 is provided in an upper portion of the swivel block 106 to evacuate the air from all hollow arm members 12, 16, from articulated connections 14, 18, 22, and from the reservoir 20 during the recovery of waste automotive fluids thereinto.

The automotive fluids recovery apparatus of the preferred embodiment as described and illustrated herein is a versatile combination of a fluid receptacle and a tool tray for automechanics. It is easily installed in most garages having vehicle hoists, and is compact in size when stowed away. These attributes are especially advantageous for meeting the environment regulations, the manpower efficiency requirements and floor space management of the modern days constrictions.

While the above description provides a full and complete disclosure of the preferred embodiment of this invention, various modifications, alternate constructions and equivalents may be employed without departing from the true spirit and scope of the invention. Such changes might involve alternate materials, components, structural arrangements, sizes, operational features or the like. Therefore the above description and accompanying illustrations should not be construed as limiting the scope of the invention which is defined by the appended claims.

We claim:

1. An apparatus for use in a service station for recovering automotive fluids, comprising:

a catch pan having a bottom portion and a contour wall around said bottom portion forming with said bottom portion a basin for receiving automotive fluids flowing from a vehicle when said vehicle is being serviced; said catch pan also having an opening in said bottom portion;

a reservoir for storing used automotive fluids;

a hollow extensible arm means connected to said reservoir and to said opening in said bottom portion of said catch pan, forming a conduit between said catch pan and said reservoir;

said hollow extensible arm means having an articulated joint near said reservoir, said articulated joint being flexible in a vertical plane and in a horizontal plane for allowing movement of said catch pan and said hollow extensible arm means between a first horizontal fluid recovery position and a second vertical stowed position;

said catch pan further having a perforated basket therein above said bottom portion, said perforated basket having an apertured sector and a closed surface sector, said closed surface sector being positioned on a normally lowermost segment of said catch pan when said catch pan is in said vertical stowed position, said closed surface sector defining with said contour wall and said bottom portion a first receptacle within said basin for receiving remnant automotive fluids adhering to said catch pan and inside said hollow extensible arm means during use of said catch pan for recovering automotive fluids, when said hollow extensible arm means and said catch pan are in said vertical stowed position.

2. An apparatus as claimed in claim 1, wherein said articulated joint comprises gas spring means to assist in the raising and lowering of said hollow extensible arm means between said fluid recovery position and said stowed position.

3. An apparatus as claimed in claim 1, wherein said hollow extensible arm means comprises a first arm member and a second arm member; said first arm member having a first end and a second end, and said second arm member having a first extremity and a second extremity; said first end being connected to said opening in said catch pan by means of a first hollow articulation; said second end being connected to said first extremity by means of a second hollow articulation, and said second extremity being connected to said articulated joint; said first hollow articulation and said second hollow articulation being flexible in respectively parallel planes.

4. An apparatus as claimed in claim 3 wherein said first hollow articulation, said second hollow articulation and said articulated joint are oriented to cooperatively form with said first and second arm members a downwardly sloping course between said catch pan and said reservoir.

5. An apparatus as claimed in claim 3, wherein said first hollow articulation comprises a latch means for restricting a movement of said catch pan relative to said first arm member.

6. An apparatus as claimed in claim 1, wherein an upper edge of said contour wall near said normally lowermost segment of said catch pan has a lip forming with said contour wall a second receptacle within said basin for receiving said remnant automotive fluids adhered to a surface of said basket, when said hollow extensible arm means and said catch pan are in said vertical stowed position.

7. An apparatus as claimed in claim 1 wherein said basket has a flat central section and a peripheral section making an obtuse angle with said flat central section whereby when said catch pan is in said fluid recovery position and when an oil filter full of used oil is supported upside down on said peripheral section, said oil filter is efficiently emptied from its used oil content.

8. An apparatus as claimed in claim 7, wherein said peripheral section forms an angle of about 160° with said flat central section.

9. An apparatus as claimed in claim 1 wherein said reservoir has an apertured flange which is attachable to a floor surface.

10. An apparatus as claimed in claim 9, wherein said reservoir comprises a sight glass for monitoring a level of said automotive fluids inside said reservoir.

11. An apparatus as claimed in claim 9 wherein said reservoir is a vertical cylindrical reservoir having a volume of about 75 liters.

12. An apparatus as claimed in claim 9 wherein said reservoir has an air intake valve, a check valve in said conduit and at least one drain valve, whereby a content of said reservoir may be purged through said drain valve, upon an application of an air pressure to said air intake valve.

13. An apparatus as claimed in claim 12 wherein said reservoir further comprises a pressure regulator on said air intake valve and a pressure relief valve to limit the possible structural stresses applied therein from said air pressure.

14. An apparatus as claimed in claim 9 wherein a height of an upper edge of said catch pan when said catch pan is in said fluid recovery position is about 152 cm from said floor surface.

15. An apparatus as claimed in claim 1, wherein said articulated joint comprises a vent hole for evacuating air from said conduit and inside said reservoir during a recovery of an automotive fluid.

16. An apparatus as claimed in claim 1 wherein said apertured sector of said basket has a plurality of holes there-through and a common size of said holes is between about 3 mm and about 5 mm.

17. An apparatus as claimed in claim 1 wherein said catch pan has a bracket extending perpendicularly from said bottom portion above said opening, and said basket is removably retained inside said catch pan by means of a wing bolt threadably engaged in said bracket.

18. An apparatus as claimed in claim 1 wherein said catch pan has a rectangular conformation having a widthwise dimension of about 40 cm and a lengthwise dimension of about 50 cm.

19. An apparatus as claimed in claim 1 wherein
said reservoir comprises an air pressure intake valve, drain valve means and a check valve communicating with said conduit for blocking said conduit and for enhancing a purging of said automotive fluids from said reservoir through said drain valve means when air pressure is applied to said air pressure intake valve; said check valve having a seep hole communicating between said reservoir and a checked portion of said check valve, for allowing said check valve to open following said purging of said automotive fluids from said reservoir.

20. An apparatus as claimed in claim 19 wherein said reservoir further has a sight glass and said drain valve means comprises a first drain valve and a second drain valve located above said first drain valve whereby aqueous fluids and petroleum based fluids may be independently emptied from said reservoir when said apparatus is used for recovering several types of automotive fluids.

* * * * *